United States Patent
Sahi

(10) Patent No.: US 9,944,329 B2
(45) Date of Patent: Apr. 17, 2018

(54) STRUCTURAL REINFORCEMENT FOR VEHICLE BODY

(71) Applicant: FORD GLOBAL TECHNOLOGIES, LLC, Dearborn, MI (US)

(72) Inventor: Jaspinder S. Sahi, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 119 days.

(21) Appl. No.: 15/248,265

(22) Filed: Aug. 26, 2016

(65) Prior Publication Data

US 2018/0057064 A1     Mar. 1, 2018

(51) Int. Cl.
    *B62D 25/06*     (2006.01)
    *B62D 25/04*     (2006.01)
    *B62D 25/02*     (2006.01)

(52) U.S. Cl.
    CPC .............. *B62D 25/06* (2013.01); *B62D 25/02* (2013.01); *B62D 25/04* (2013.01)

(58) Field of Classification Search
    CPC ......... B62D 25/04; B62D 25/06; B62D 27/02
    USPC ...... 296/187.13, 30, 193.12, 193.06, 187.12, 296/210, 216.07, 216.09, 216.06
    See application file for complete search history.

(56) References Cited

U.S. PATENT DOCUMENTS

| | | | |
|---|---|---|---|
| 7,293,823 B2 | 11/2007 | Chen et al. | |
| 7,407,222 B2 | 8/2008 | Anderson et al. | |
| 8,388,046 B2 | 3/2013 | Hutter et al. | |
| 9,248,863 B2* | 2/2016 | Matsuura | B62D 25/06 |
| 9,828,035 B1* | 11/2017 | Sassi | B62D 25/06 |
| 2006/0202518 A1* | 9/2006 | Osterberg | B62D 25/02 296/193.12 |
| 2006/0202520 A1* | 9/2006 | Osterberg | B62D 25/06 296/210 |
| 2009/0174229 A1* | 7/2009 | Ordonio | B62D 25/06 296/216.06 |
| 2012/0153676 A1* | 6/2012 | Shono | B62D 25/04 296/193.06 |
| 2017/0297631 A1* | 10/2017 | Schneider | B62D 25/2036 |

FOREIGN PATENT DOCUMENTS

KR          100362412       5/2002

* cited by examiner

*Primary Examiner* — Jason S Morrow
(74) *Attorney, Agent, or Firm* — Jason C. Rogers; Brooks Kushman P.C.

(57) ABSTRACT

A structural reinforcement member for a vehicle body includes a bracket sized for mounting to a roof rail, spanning along the roof rail from a first pillar past a second pillar, and including a first support member extending inboard at a first roof bow. The bracket and the first roof bow are arranged such that the first support member transfers a load applied to the vehicle body to the first roof bow. The first support member may be shaped to conform to a shape of an end of the first roof bow that the first support member is secured thereto. A second roof bow may extend from the roof rail and the bracket may further include a second support member extending inboard at the second roof bow.

20 Claims, 5 Drawing Sheets

STRUCTURAL REINFORCEMENT FOR VEHICLE BODY

TECHNICAL FIELD

This disclosure relates to structural reinforcement for portions of a vehicle body including a roof rail.

BACKGROUND

Vehicle manufacturers assemble automotive vehicles with a common platform, such as a common body structure, to obtain cost benefits. Vehicles of the common platform may have varied characteristics, such as different powertrains or propulsion systems. In one example, a common body structure may be used for a hybrid vehicle, an electric vehicle, and a vehicle with an internal combustion engine only. The common body structure may include structural reinforcement characteristics which are not needed for each of the vehicles. For example, the hybrid vehicle may need additional structural support components due to inclusion of a high voltage traction battery. Including these structural support components with the body structure for the vehicle with the internal combustion engine may result in additional and unnecessary weight.

This disclosure is directed to solving the above problems and other problems as summarized below.

SUMMARY

A structural reinforcement member for a vehicle body includes a bracket sized for mounting to a roof rail, spanning along the roof rail from a first pillar past a second pillar, and including a first support member extending inboard at a first roof bow. The bracket and the first roof bow are arranged such that the first support member transfers a load applied to the vehicle body to the first roof bow. The first support member may be shaped to conform to a shape of an end of the first roof bow that the first support member is secured thereto. A second roof bow may extend from the roof rail and the bracket may further include a second support member extending inboard at the second roof bow. The first support member and the second support member may extend inboard a predetermined distance based on a weight of the vehicle body. The first and second roof bows may be spaced from one another at a distance sufficient for a moon roof to be disposed therebetween. The bracket may further include a first end secured to a vehicle front header at a region adjacent the first pillar. The bracket may be further sized to span along the roof rail from the first pillar to a location at or past a third pillar. The bracket may include one or more flanges for securing to the roof rail.

An assembly to structurally reinforce a vehicle body includes a roof rail, an a-pillar, a b-pillar, a c-pillar, a first roof bow, a second roof bow, and a reinforcement member. The first roof bow extends from the roof rail at the b-pillar. The second roof bow extends from the roof rail between the b-pillar and c-pillar. The reinforcement member extends along the roof rail from the a-pillar to the second roof bow, and includes a first support member extending from the reinforcement member to support an end of the first roof bow secured to the roof rail and a second support member extending from the reinforcement member to support an end of the second roof bow secured to the roof rail. The reinforcement member is arranged with the pillars and bows to structurally reinforce the vehicle body and transfer a load applied to the vehicle body to the bows. A front header may be mounted to a portion of the a-pillar and a portion of the reinforcement member. The first support member and the second support member may extend from the reinforcement member along the first roof bow a predetermined distance based on a weight of the vehicle body. The first support member and the second support member may define a profile substantially similar to a profile of the respective roof bow mounted thereto. The reinforcement member may extend along the roof rail from the a-pillar to the c-pillar. The reinforcement member may further extend to one of a location adjacent the c-pillar of the vehicle body and a location rearward to the c-pillar. The reinforcement member may include one or more flanges for securing to the roof rail.

A structural reinforcement assembly for a vehicle body includes first and second roof rails, a front header, a first roof bow, a moon roof bracket, and a reinforcement member. The front header spans between the first and second roof rails at a forward portion of the vehicle body. The first roof bow spans between the first and second roof rails rearward of the front header. The moon roof bracket is sized for disposal between the front header and the first roof bow. The reinforcement member is secured to one of the roof rails, extends on either side of a b-pillar of the vehicle body, and includes a first support member extending inboard and secured to the first roof bow to transfer a load applied to the vehicle body to the first roof bow. The reinforcement member may further include a second support member extending inboard therefrom and secured to a portion of the moon roof bracket. The moon roof bracket may define an opening sized to receive glass of a moon roof. The first roof bow may be mounted to the roof rails rearward of the b-pillar. The first support member may define a profile substantially similar to a profile defined by the first roof bow. The reinforcement member may further extend to a c-pillar of the vehicle body.

DETAILED DESCRIPTION

Embodiments of the present disclosure are described herein. It is to be understood, however, that the disclosed embodiments are merely examples and other embodiments can take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle manufacturers assemble vehicles having distinct characteristics on a common vehicle platform. For example, a body structure for a vehicle may be common across vehicle configurations having different propulsion systems such as an internal combustion engine (ICE) vehicle, a hybrid vehicle (HEV), and a plug-in hybrid electric vehicle (PHEV). Powertrains of hybrid vehicles typically have a weight higher than that of an internal combustion vehicle due to inclusion of a high voltage battery pack. A body support structure design compensating for the higher powertrain weight may not be appropriate for ICE vehicles due to the extra weight. In order to reduce complexity in manufacturing and assembly, a common body support structure may be used for ICE vehicles, HEV, and PHEV thereby reducing a fuel economy of the ICE vehicle. A roof rail is a portion of the vehicle body support structure receiving a majority of a load during certain types of impacts including a side impact, a roof crush, and a front impact.

Figure 1:
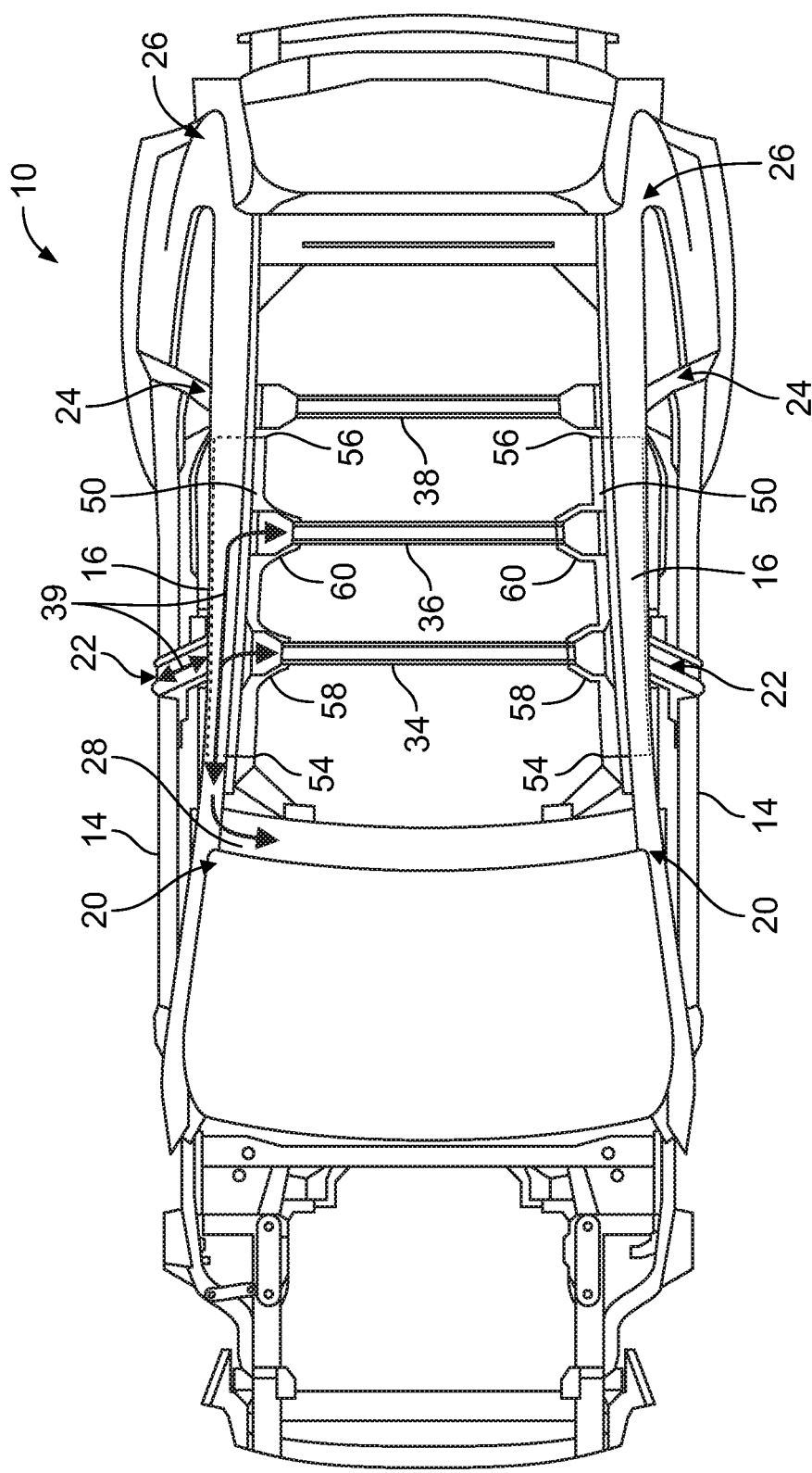
FIG. 1 is a top view of an example of a vehicle body.

FIG. 1 illustrates an example of a portion of a vehicle body referred to generally as a vehicle body 10 herein. The vehicle body 10 includes rocker panels 14 spaced from roof rails 16. Pillars extend between the rocker panels 14 and the roof rails 16. For example, the vehicle body 10 may include a-pillars 20, b-pillars 22, c-pillars 24, and d-pillars 26. The a-pillars 20 are spaced from one another and partially define an opening for a front windshield. A front header 28 spans between the a-pillars 20. The a-pillars 20, the b-pillars 22, the rocker panels 14, and the roof rails 16 define an opening for a front door. The b-pillars 22, the c-pillars 24, the rocker panels 14, and the roof rails 16 define an opening for a rear door. The c-pillars 24 and the d-pillars 26 partially define a trunk portion of the vehicle. The d-pillars 26 are spaced from one another to partially define an opening for a rear hatch.

One or more roof bows assist in providing structural rigidity to the vehicle body 10. For example, a first roof bow 34, a second roof bow 36, and a third roof bow 38 extend between the roof rails 16. These roof bows assist in absorbing forces received by the vehicle during an impact to the vehicle body 10. Force from an impact to the vehicle body is represented by a force arrow 66. The reinforcement members 50 are oriented upon the vehicle body 10 to assist in absorbing and dispersing forces received. Force arrows 39 illustrate an example in which the reinforcement members 50 disperses an impact force along the roof rail 16 and across the first roof bow 34 and the second roof bow 36.

Examples scenarios under which loads are applied to the vehicle body 10 include a side impact, a roof crush, and a frontal impact. The first roof bow 34 includes ends adjacent the b-pillars 22. The third roof bow 38 includes ends adjacent the c-pillars 24. The second roof bow 36 is disposed between the first roof bow 34 and the third roof bow 38. While the vehicle body 10 may be used across various platforms including the ICE vehicle, the HEV, and the PHEV, a different powertrain weight exists due to inclusion of a traction battery (not shown) as described above. A reinforcement member may be positioned on the vehicle body 10 to assist in providing a common body structure design for ICE vehicles, HEV, and PHEV in which loads applied to the vehicle body 10 are absorbed and vehicle fuel economy is improved due to a reduced weight of the vehicle body 10.

Figure 2A:
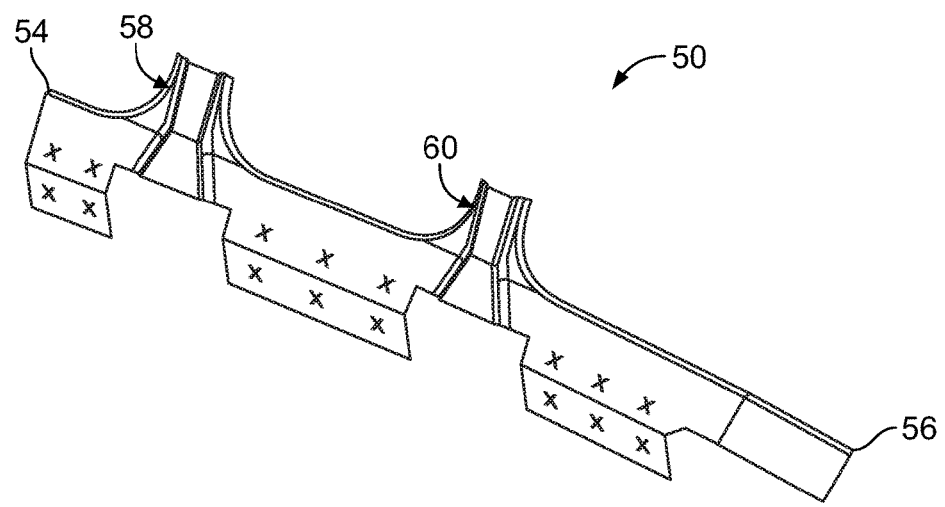
FIG. 2A is a perspective view of an example of a reinforcement member for the vehicle body of FIG. 1.
Figure 2B:
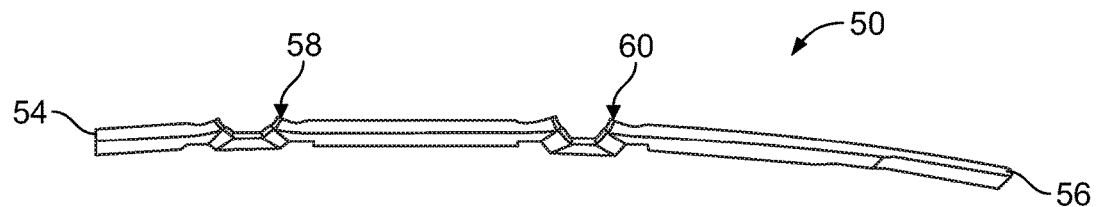
FIG. 2B is a side view of the example of the reinforcement member of FIG. 2A.

FIGS. 2A and 2B illustrate an example of a reinforcement member for the vehicle body 10, referred to generally as a reinforcement member 50 herein. The reinforcement member 50 may also be referred to as a bracket. Two reinforcement members 50 may be mounted opposite one another on the vehicle body 10 at respective roof rails 16. The reinforcement member 50 assists in increasing a structural rigidity of the vehicle body 10. For example, the reinforcement member 50 may be located at a position on the vehicle body 10 in which the reinforcement member 50 displaces forces to the roof bows which result from an impact, such as a side, front, rear, or roof impact. The reinforcement member 50 includes a first end 54 and a second end 56. The first end 54 is secured at the a-pillar 20. The first end 54 may be secured to the front header 28. The second end 56 may be secured to the roof rail 16 at various locations based on a predetermined size of the reinforcement member 50. In one example, the second end 56 is secured to the roof rail 16 at a location between the b-pillar 22 and the c-pillar 24. It is also contemplated that the second end 56 may be secured to the roof rail 16 at a location adjacent to or at the c-pillar 24. As such, the reinforcement member 50 may extend along the roof rail 16 from the a-pillar 20 to or past the c-pillar 24.

The reinforcement member 50 includes a first support member 58 and a second support member 60. It is contemplated that the reinforcement member 50 may include only one support member or more than one support member. The reinforcement member 50 is arranged with the vehicle body 10 to orient the first support member 58 with the first roof bow 34 and the second support member 60 with the second roof bow 36. The first support member 58 and the second support member 60 may define a profile to match a shape of the respective roof bow. For example, the support members are shown with a substantially U-shaped profile in FIG. 2B. Optionally, the reinforcement member may include one or more flanges 62 for securing to the roof rail 16. Potential weld spots are illustrated with Xs in FIG. 2A.

Figure 3:
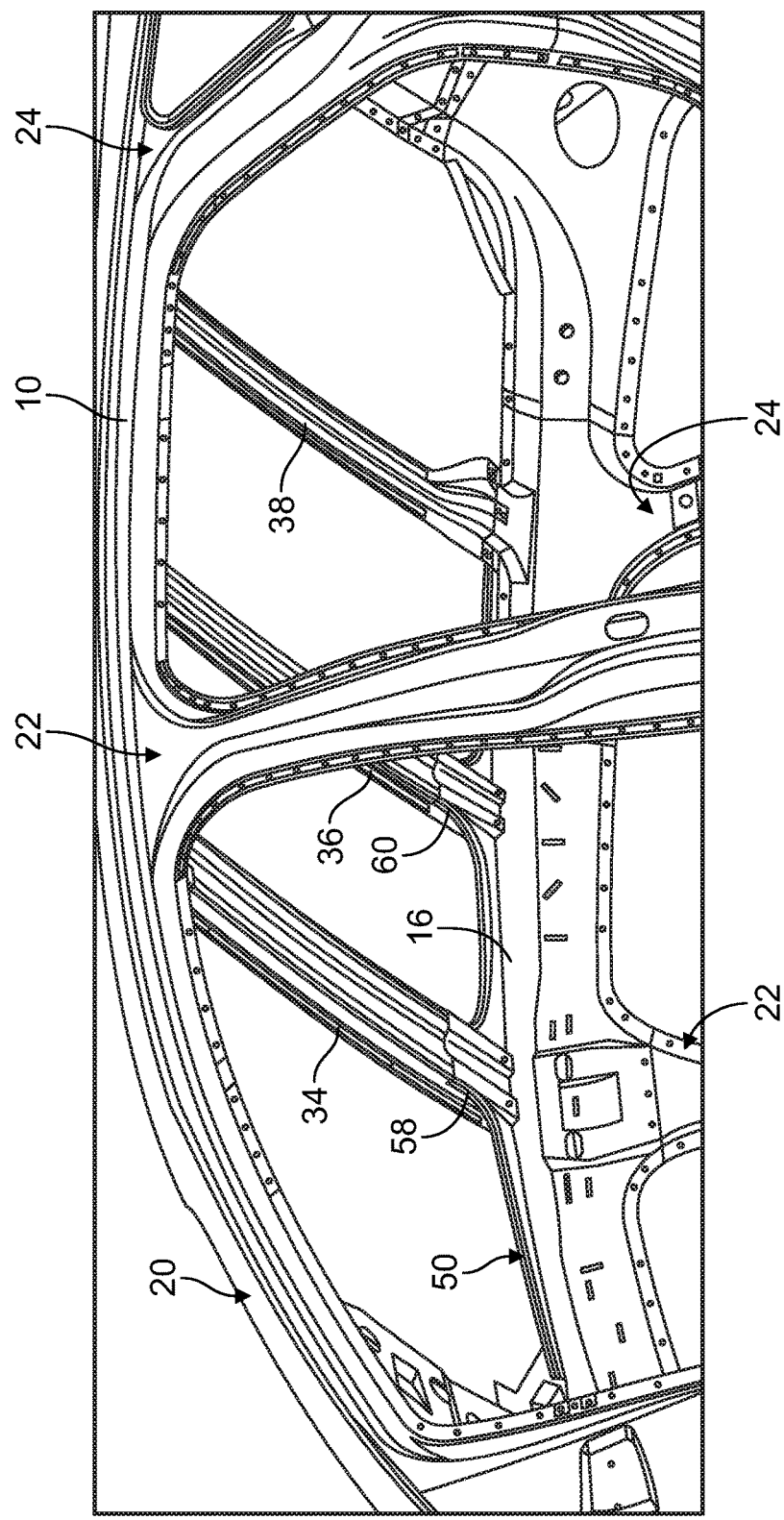
FIG. 3 is a lower fragmentary perspective view of a portion of the vehicle body of FIG. 1 showing the reinforcement member of FIGS. 2A and 2B mounted upon the vehicle body.
Figure 4:
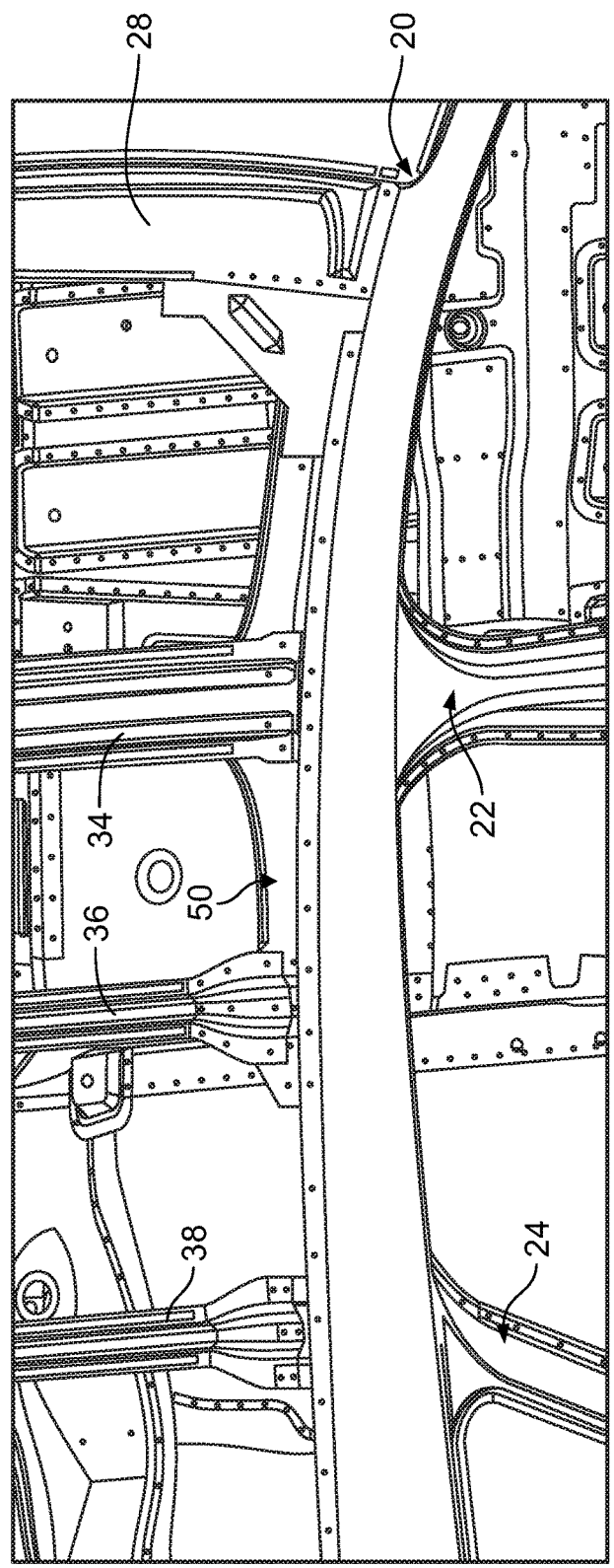
FIG. 4 is an upper fragmentary perspective view of a portion of the vehicle body of FIG. 1 showing the reinforcement member of FIG. 2A mounted upon the vehicle body.

FIGS. 3 and 4 illustrate additional views of the reinforcement member 50 secured to the vehicle body 10. The support members extend from the reinforcement member 50 to structurally reinforce the roof bows and vehicle body 10. The first support member 58 extends from the reinforcement member 50 at the first roof bow 34. The first support member 58 extends inboard, relative to the vehicle body 10, a first predetermined distance selected based on a weight of the vehicle body 10. The second support member 60 extends inboard a second predetermined distance based on the weight of the vehicle body 10.

Figure 5:
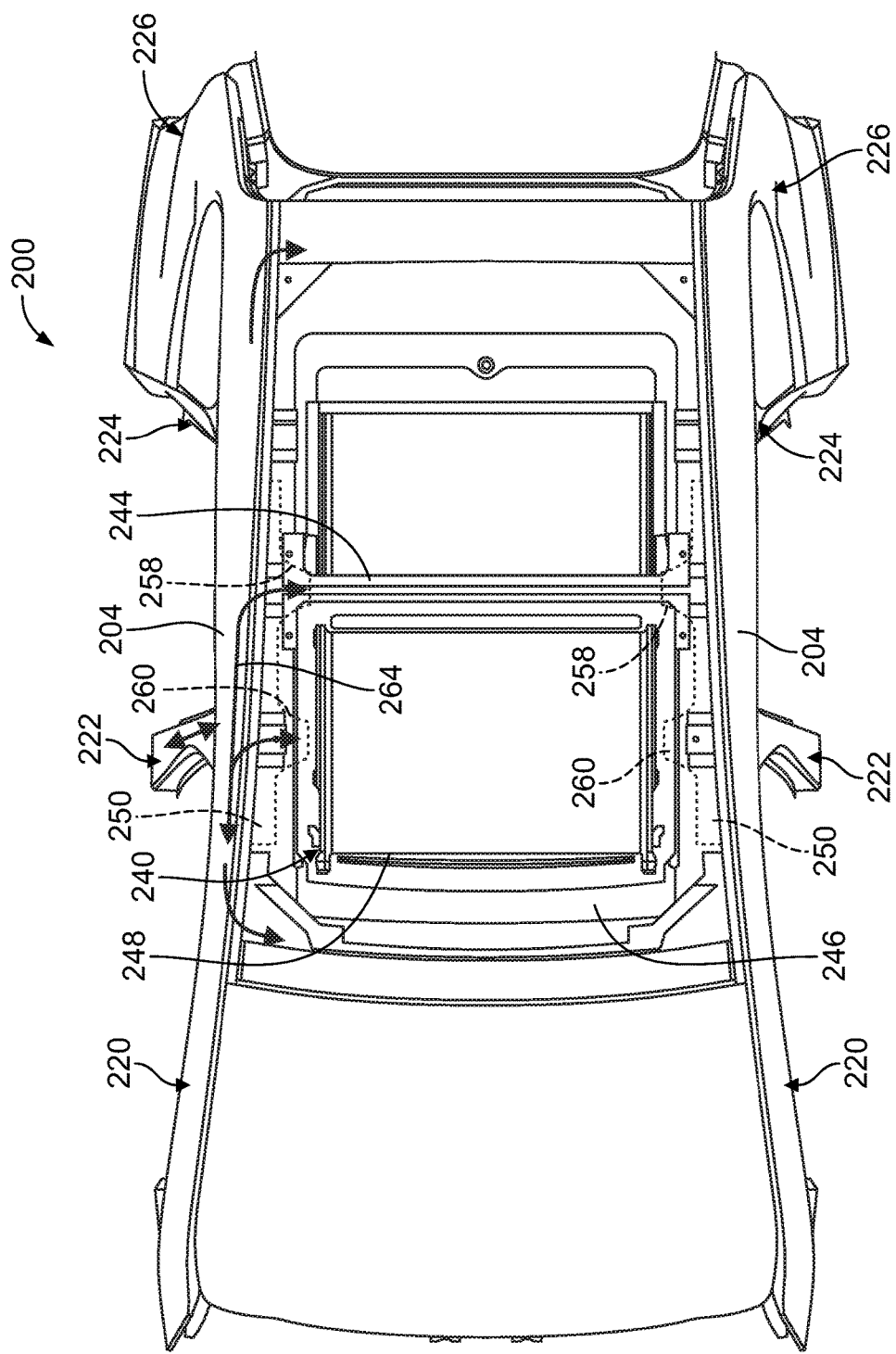
FIG. 5 is a top view of an example of a vehicle body including a moon roof.

FIG. 5 illustrates another example of a vehicle body, referred to generally as a vehicle body 200 herein. In this example, the vehicle body 200 may be sized to accommodate a moon roof. The vehicle body 200 includes a pair of roof rails 204. Pillars extend between rocker panels (not shown) of the vehicle body 200 and the pair of roof rails 204. For example, the vehicle body 200 includes a-pillars 220, b-pillars 222, c-pillars 224, and d-pillars 226. The a-pillars 220 are spaced from one another and partially define an opening to receive a front windshield. The a-pillars 220, the b-pillars 222, the rocker panels, and the roof rails 204 define an opening for a front door therebetween. The b-pillars 222, the c-pillars 224, the rocker panels, and the roof rails 204 define an opening for a rear door therebetween. The c-pillars 224 and the d-pillars 226 partially define a trunk portion of the vehicle. The d-pillars 226 are spaced from one another to partially define an opening for a rear hatch.

A moon roof bracket 240 is sized for mounting to a first roof bow 244, a front header 246, and each of the pair of roof rails 204. The moon roof bracket 240 defines an opening 248 sized to receive glass of a moon roof (not shown). Each of a pair of reinforcement members 250 may be mounted to one of the roof rails 204 to assist in transferring loads applied to the vehicle body 200 to the first roof bow 244. For example, each of the reinforcement members 250 may be mounted such that the reinforcement member 250 extends along the respective roof rail 204 on either side of the respective b-pillars 222. A first end of each of the reinforcement members 250 may be mounted to the respective roof rail 204 and/or the front header 246 at the respective a-pillar 220. A second end of each of the reinforcement members 250 may be mounted to the respective roof rail 204 at a location adjacent the respective c-pillar 224.

Each reinforcement member 250 includes a first support member 258 and a second support member 260. Each of the first support members 258 may extend inboard and be secured to a portion of the first roof bow 244. The first roof bow 244 may be mounted to the roof rails 204 rearward of the b-pillar 222. Each of the second support members 260 may extend inboard and be secured to a portion of the moon roof bracket 240. The first support member 258 and the second support member 260 may transfer loads applied to the vehicle body 200 to the first roof bow 244 and the roof rails 204.

FIG. 5 shows an example of loads which may be applied to the vehicle body 200.

The loads may be a result of, for example, a side impact, a front impact, or a roof impact. Force from an impact to the vehicle body 200 is represented by a force arrow 264. The reinforcement members 250 are oriented upon the vehicle body 200 to assist in absorbing and dispersing forces received. Force arrows 268 illustrate an example in which the reinforcement members 250 disperse the impact force along the roof rail 204 and across the first roof bow 244.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A structural reinforcement member for a vehicle body comprising:
    a bracket sized for mounting to a roof rail, spanning along the roof rail from a first pillar past a second pillar, and including a first support member extending inboard at a first roof bow, wherein the bracket and the first roof bow are arranged such that the first support member transfers a load applied to the vehicle body to the first roof bow.

2. The structural reinforcement member of claim 1, wherein the first support member is shaped to conform to a shape of an end of the first roof bow that the first support member is secured thereto.

3. The structural reinforcement member of claim 1 further comprising a second roof bow extending from the roof rail, wherein the bracket further includes a second support member extending inboard at the second roof bow, and wherein the first support member and the second support member extend inboard a predetermined distance based on a weight of the vehicle body.

4. The structural reinforcement member of claim 3, wherein the first and second roof bows are spaced from one another at a distance sufficient for a moon roof to be disposed therebetween.

5. The structural reinforcement member of claim 1, wherein the bracket further includes a first end secured to a vehicle front header at a region adjacent the first pillar.

6. The structural reinforcement member of claim 1, wherein the bracket is further sized to span along the roof rail from the first pillar to a location at or past a third pillar.

7. The structural reinforcement member of claim 1, wherein the bracket includes one or more flanges for securing to the roof rail.

8. An assembly to structurally reinforce a vehicle comprising:
    a vehicle body including a roof rail, an a-pillar, a b-pillar, and a c-pillar;
    a first roof bow extending from the roof rail at the b-pillar;
    a second roof bow extending from the roof rail between the b-pillar and c-pillar; and
    a reinforcement member extending along the roof rail from the a-pillar to the second roof bow, and including a first support member extending from the reinforcement member to support an end of the first roof bow secured to the roof rail and a second support member extending from the reinforcement member to support an end of the second roof bow secured to the roof rail, wherein the reinforcement member is arranged with the pillars and bows to structurally reinforce the vehicle body and transfer a load applied to the vehicle body to the bows.

9. The assembly of claim 8, further comprising a front header mounted to a portion of the a-pillar and a portion of the reinforcement member.

10. The assembly of claim 8, wherein the first support member and the second support member extend from the reinforcement member along the first roof bow a predetermined distance based on a weight of the vehicle body.

11. The assembly of claim 8, wherein the first support member and the second support member define a profile substantially similar to a profile of the respective roof bow mounted thereto.

12. The assembly of claim 8, wherein the reinforcement member extends along the roof rail from the a-pillar to the c-pillar.

13. The assembly of claim 8, wherein the reinforcement member further extends to one of a location adjacent the c-pillar of the vehicle body and a location rearward to the c-pillar.

14. The assembly of claim 8, wherein the reinforcement member includes one or more flanges for securing to the roof rail.

15. A structural reinforcement assembly for a vehicle body comprising:
- first and second roof rails;
- a front header spanning between the first and second roof rails at a forward portion of the vehicle body;
- a first roof bow spanning between the first and second roof rails rearward of the front header;
- a moon roof bracket sized for disposal between the front header and the first roof bow; and
- a reinforcement member secured to one of the roof rails, extending on either side of a b-pillar of the vehicle body, and including a first support member extending inboard and secured to the first roof bow to transfer a load applied to the vehicle body to the first roof bow.

16. The assembly of claim 15, wherein the reinforcement member further includes a second support member extending inboard therefrom and secured to a portion of the moon roof bracket.

17. The assembly of claim 15, wherein the moon roof bracket defines an opening sized to receive glass of a moon roof.

18. The assembly of claim 15, wherein the first roof bow is mounted to the roof rails rearward of the b-pillar.

19. The assembly of claim 15, wherein the first support member defines a profile substantially similar to a profile defined by the first roof bow.

20. The assembly of claim 15, wherein the reinforcement member further extends to a c-pillar of the vehicle body.

* * * * *